(12) United States Patent
Zhu (10) Patent No.: US 7,778,673 B2
(45) Date of Patent: Aug. 17, 2010

(54) MOBILE PHONE WITH BIDIRECTIONAL SWIVELING DISPLAY

(76) Inventor: Zhanxin Zhu, Chaoyang District, Room 410, Min 35, No. 2 Jintai Xilu, Beijing (CN) 100026

( * ) Notice: Subject to any disclaimer, the term of this patent is extended or adjusted under 35 U.S.C. 154(b) by 438 days.

(21) Appl. No.: 11/962,362

(22) Filed: Dec. 21, 2007

(65) Prior Publication Data
US 2008/0096618 A1 Apr. 24, 2008

Related U.S. Application Data

(63) Continuation of application No. PCT/CN2006/001451, filed on Jun. 26, 2006.

(30) Foreign Application Priority Data
Jun. 24, 2005 (CN) .................. 2005 1 0077747

(51) Int. Cl.
*H04M 1/00* (2006.01)
*H04B 1/38* (2006.01)

(52) U.S. Cl. ............. 455/566; 455/550.1; 455/575.1; 455/575.3; 455/90.3; 379/433.01; 379/433.04; 379/433.1; 379/433.13; 16/302; 16/343; 16/347

(58) Field of Classification Search ............. 455/550.1, 455/566, 575.1, 575.3, 90.3; 379/433.01, 379/433.04, 433.1, 433.13; 16/302, 343, 16/347
See application file for complete search history.

(56) References Cited

U.S. PATENT DOCUMENTS

| | | | |
|---|---|---|---|
| 7,151,911 B2 * | 12/2006 | Matsumoto | 455/90.2 |
| 7,386,330 B2 * | 6/2008 | Takagi | 455/575.3 |
| 7,499,737 B2 * | 3/2009 | Mizuta et al. | 455/575.3 |
| 7,599,720 B2 * | 10/2009 | Fujihara et al. | 455/575.1 |
| 7,603,149 B2 * | 10/2009 | Kim | 455/575.3 |
| 7,627,342 B2 * | 12/2009 | Kang | 455/556.1 |

* cited by examiner

*Primary Examiner*—Tuan A Tran
(74) *Attorney, Agent, or Firm*—Matthias Scholl P.C.; Matthias Scholl (57) ABSTRACT

Taught is a mobile phone with a bidirectional swiveling display, comprising a display, a main portion and a rotating portion having a body and a second axis. The body comprises a hole horizontally disposed therein and a first axis perpendicular to the hole. The first axis is rotatably inserted in the hollow supporter. One end of the second axis is fixed at the back of the display. The other end of the second axis is rotatably inserted in the hole of the body, so that the display is capable of rotating around the second axis. The display is also capable of rotating around the first axis.

16 Claims, 10 Drawing Sheets

Fig. 12

MOBILE PHONE WITH BIDIRECTIONAL SWIVELING DISPLAY

CROSS-REFERENCE TO RELATED APPLICATIONS

This application is a continuation of International Patent Application No. PCT/CN2006/001451, with an international filing date of Jun. 26, 2006, designating the United States, now pending, which is based on Chinese Patent Application No. 200510077747.8, filed Jun. 24, 2005. The contents of the aforementioned specifications are incorporated herein by reference.

BACKGROUND OF THE INVENTION

1. Field of the Invention

The invention relates to a mobile phone, and more particularly to a mobile phone with a bidirectional swiveling display.

2. Description of the Related Art

Three types of mobile phones are widely used at the present: the bar-type, the slide-up type, and the flip-top type. Bar-type mobiles have an LCD display and keyboard exposed on the outside. Slide-up type mobiles include an LCD display and keyboard that is slidably opened and closed. Swivel type mobiles have a display rotating around a main body. Bar-type mobile phones are the most common of the three.

Chinese Pat. No. CN2660805Y discloses a dual-axis mobile phone comprising a front portion, a back portion, and a first axis. The front portion comprises a second axis and a display, and the back portion comprises an input keypad and/or an image sensor. The front portion is capable of rotating 360 degrees around the first axis on the back portion. The direction of movement of the first axis is parallel to the image sensor, and is perpendicular to the second axis, and the direction of movement of the input keypad is approximately parallel to the image sensor.

However, problems with the dual-axis mobile phone are that the battery is disposed at the back of the back portion of the phone, and takes up most space of the back, the left-side and the right-side of the mobile phone, which makes it impossible to arrange keypads thereon, and thus greatly influence multiple functionalities and personalization of the mobile phone. Moreover, as a user holds the back, the left-side and the right-side of the mobile phone, his finger often touches the keypad, which causes undesired operation.

SUMMARY OF THE INVENTION

In view of the above-described problems, it is one objective of the invention to provide a mobile phone with a bidirectional swiveling display that swivels bidirectionally.

Another objective of the invention is to provide a mobile phone with a bidirectional swiveling display that allows for multiple functionalities and personalization of the mobile phone.

A further objective of the invention to provide a mobile phone with a bidirectional swiveling display that comprises a standalone multifunctional compartment for receiving a battery and one or more add-on cards.

A still further objective of the invention to provide a mobile phone with a bidirectional swiveling display that has groups of keypads disposed on different sides and end surfaces of the main portion of the mobile phone.

To achieve the above objectives, in accordance with one embodiment of the invention, provided is a mobile phone with a bidirectional swiveling display, comprising a display, a main portion and a rotating portion having a body and a second axis. The body comprises a hole horizontally disposed therein and a first axis perpendicular to the hole. The first axis is rotatably inserted in a hollow supporter. One end of the second axis is fixed at the back of the display. The other end of the second axis is rotatably inserted in the hole of the body, so that the display is capable of rotating around the second axis. The display is also capable of rotating around the first axis.

In certain classes of this embodiment, a first tab extends downwardly from the bottom of the body, a first stop block is disposed on an outer surface of the top of the hollow supporter, and the first tab is engaged with the first stop block, so as to prevent the display from rotating around the first axis.

In certain classes of this embodiment, four protrusions each having a semicircular cross-section are disposed at the bottom of the body. A first contact is disposed on one of the protrusions. Four first grooves corresponding to and engaged with the four protrusions are disposed on an end surface of the hollow supporter, each of the first grooves having a semicircular cross-section. A second contact is disposed on each of the first grooves, and the first contact contacts with the second contact as the display rotates around the first axis.

In certain classes of this embodiment, several groups of keypads are disposed on front, back, left and right surfaces and the upper end surface of the main portion. One group of keypads disposed on the upper end surface of the main portion is located at both ends thereof.

In certain classes of this embodiment, a hollow protruding edge is disposed on a front surface of the body opposite to the back of the display. A pair of second tabs is disposed at both sides of the hollow protruding edge. A pair of second stop blocks is disposed at the back of the display. The second tab is engaged with the second stop block, so as to prevent the display from rotating around the second axis.

In certain classes of this embodiment, a pair of sockets are disposed at both sides of the hole, and connected thereto, an abutting portion is disposed in each of the sockets, and the abutting portion has a spring disposed on one side thereof.

In certain classes of this embodiment, a second groove is surroundingly disposed on an outer surface of the second axis, and a concave is disposed in the second groove at every certain angle.

In certain classes of this embodiment, one end of the abutting portion is inserted into or removed from the concave, so that the display is positioned while rotating around the second axis.

In certain classes of this embodiment, an opening is disposed on the second axis, so as to enable a wire supplying information and power to the displaying part to pass through.

In certain classes of this embodiment, a cover plate is disposed on one end of the second axis, so as to seal the end.

In certain classes of this embodiment, a webcam is disposed at or near the second axis.

In certain classes of this embodiment, a pair of arc-shaped grooves are disposed on upper edges of the front and the back of the main portion, and another pair of arc-shaped grooves perpendicular to the front and the back of the main portion are disposed on the upper end surface of the main portion, so as to enable the display to rotate around the second axis.

In certain classes of this embodiment, a hollow sealing cover is disposed at the bottom of the first axis, and a spring is disposed between a top of the hollow sealing cover and a bottom of the hollow supporter, so as to support the first axis.

In certain classes of this embodiment, a pair of multifunctional compartments is disposed on both sides of the body, a slot is disposed in the multifunctional compartment, and a changeable adapter having a card holder and a module socket on both sides thereof is disposed in the slot.

In certain classes of this embodiment, a pair of multifunctional compartments is disposed on both sides of the body, and a battery is disposed in the multifunctional compartment.

In certain classes of this embodiment, a pair of inserting slots is disposed on opposite sidewalls in the main portion, and a changeable adapter having a card holder and a module socket on both sides thereof is disposed in the inserting slot.

Advantages of the invention are as described below.

1. The display not only rotates along with the rotating portion and the multifunctional compartment around the first axis, but also rotates around the second axis. As the display rotates to different positions on the main portion, the first contact contacts with a corresponding second contact, and the corresponding keypads operate, so that different functions corresponding thereto are realized. This avoids interference between different functions, and thus realizes multiple functionalities and personalization of the mobile phone. As the display rotates around the second axis, the display is horizontal or vertical, so that a user may choose to view his mobile phone from different angles.

2. A battery is installed on the inserting slot in the multifunctional compartment, and may be a dry or wet battery. The design and installation of the inserting slot is also suitable for a bar-type mobile. Arrangement of the multifunctional compartment makes it convenient to install and disassemble both a dry battery and a wet battery, and to add material, e.g., fuel, to the wet battery.

3. As one multifunctional compartment is installed with a battery, the other one may be equipped with a mini-speaker or an adapter having a card holder and a module socket, so as to enhance functions of the mobile phone.

4. The multifunctional compartment is located at both sides of the rotating portion, which increases space for installing the battery or a number of batteries, and thus operating time of the mobile phone is prolonged.

5. Since two multifunctional compartments each having one battery sequentially supply power to the mobile phone, as energy of one battery is to be used up, an alarm light (not shown) remind a user of recharging in time. After the second battery starts operating, if a user still does not recharges the first battery, the alarm light will keep reminding a user of recharging. This greatly improves continuity of power supply, and ensures normal operation of the mobile phone.

6. Since no battery is installed in the back of the main portion, available area of the main portion increases, which makes it possible to arrange keypads on five surfaces of the main portion, and increases/reserves space for development of multiple functionalities and personalization of the mobile phone.

7. Since no battery is installed in the main portion, inner space of the main portion increases, which makes it possible to install more add-on cards and personalized modules therein. Moreover, since a pair of inserting slots is disposed on opposite sidewalls in said main portion, a user is capable of changing add-on cards as required, so as to adapt to development of multiple functionalities and personalization of the mobile phone.

8. Since two pairs of arc-shaped grooves are disposed at the top of the main portion, it is convenient for the display to transfer between a vertical state and a horizontal state. Meanwhile, since a gap between the display rotating vertically and the main portion is minimized, the mobile phone of the invention is more compact. On the contrary, if no arc-shaped grooves are disposed on the main portion, the distance between the display and the main portion must be increased as the display rotates around the second axis, which may cause complex structure of the mobile phone, influence arrangement of circuits, and increase a dimension of the mobile phone in the axial direction of the first axis. Accordingly, even a distance between the display and the main portion is not increased; a bottom of the display is made into arc-shaped since no grooves are disposed on the main portion. In this case, the size of the screen is comparatively small under same length and width requirements.

BRIEF DESCRIPTION OF THE DRAWINGS

The invention will now be described solely by way of example and with reference to the accompanying drawings in which.

DETAILED DESCRIPTION OF THE INVENTION

Figure 1:
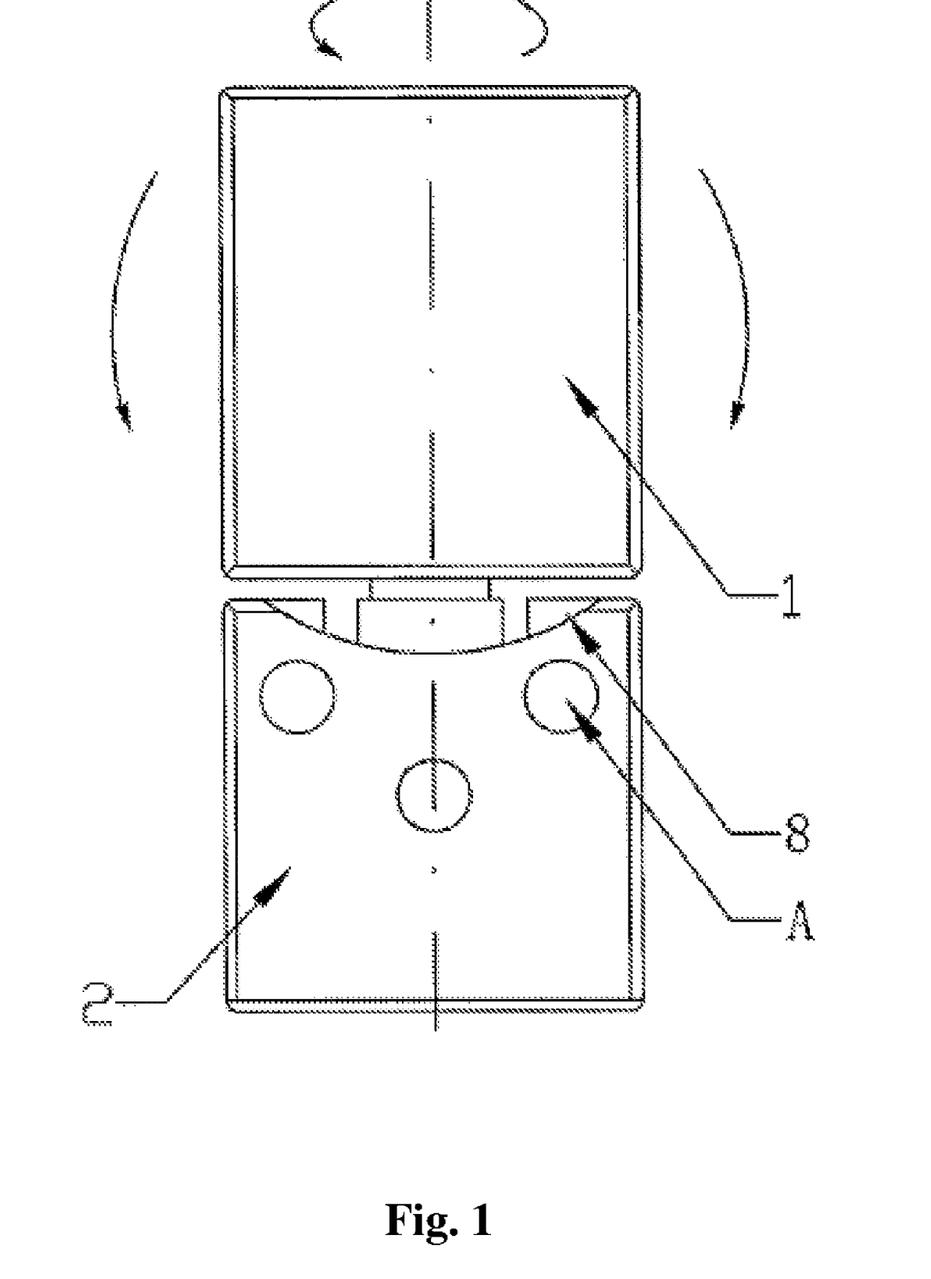
FIG. 1 is a front view of a mobile phone with a bidirectional swiveling display according to one embodiment of the invention.
Figure 2:
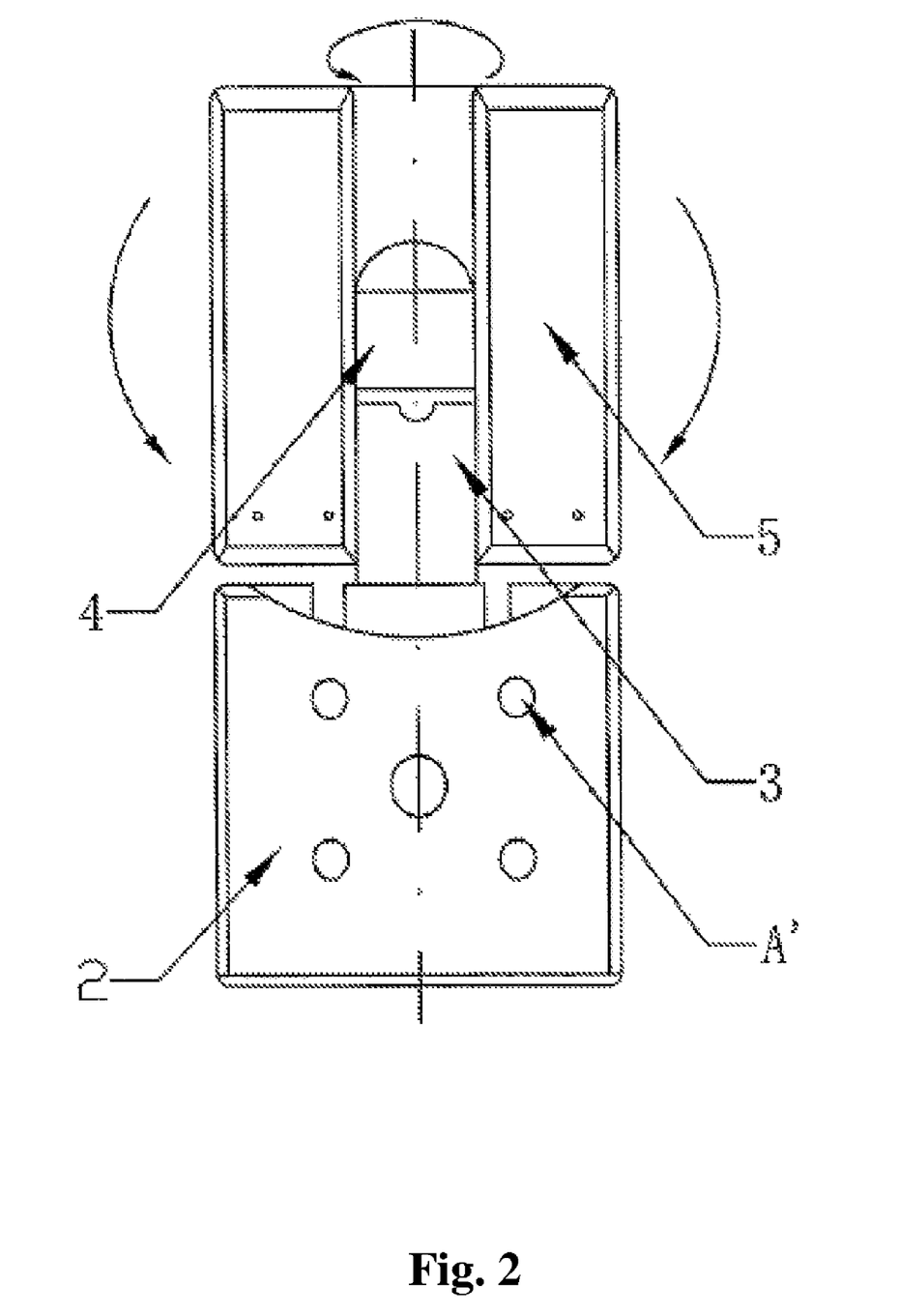
FIG. 2 is a back view of a mobile phone with a bidirectional swiveling display according to one embodiment of the invention.
Figure 3:
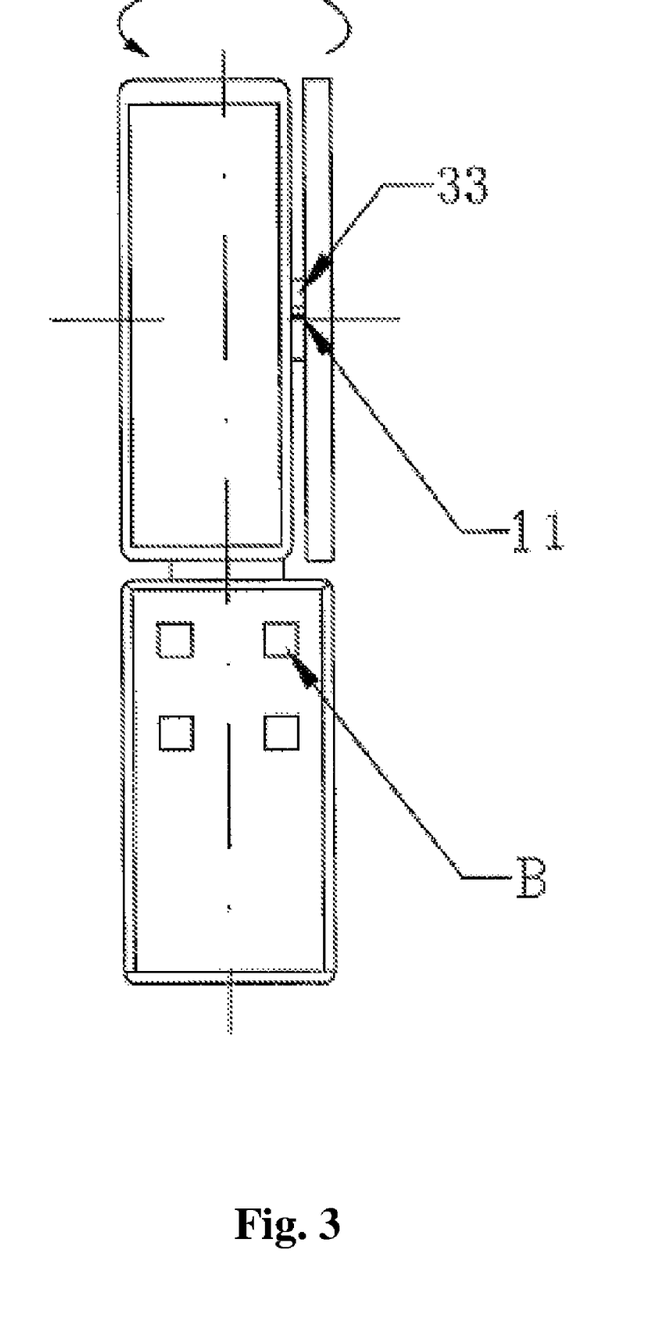
FIG. 3 is a left side view of a mobile phone with a bidirectional swiveling display according to one embodiment of the invention.

As shown in FIGS. 1-3, a mobile phone with a bidirectional swiveling display of the invention comprises a display 1, a main portion 2 and a rotating portion 3. For clarity, a surface of the main portion 2 shown parallel to the drawing sheet in FIG. 1 is defined as the front of the main portion 2, a left-hand side is defined as a left surface of the main portion 2, and a right-hand side is defined as a right surface of the main portion 2.

With reference to FIG. 2, a hollow supporter 3 extends upwardly from the main portion 2. In this embodiment, the hollow supporter 3 is disposed on the upper end surface of the main portion 2.

The rotating portion comprises a body 4 and a second axis 30. The body 4 comprises a hole 21 horizontally disposed therein and a first axis 13 perpendicular to the hole 21. The first axis 13 is rotatably inserted in the hollow supporter 3. One end of the second axis 30 is fixed at the back of the display 1, and the other end thereof is rotatably inserted in the hole 21, so that the display 1 is capable of rotating around the second axis 30. The display 1 is also capable of rotating around the first axis 13. Thus, bidirectional swiveling of the display 1 is implemented.

Figure 4:
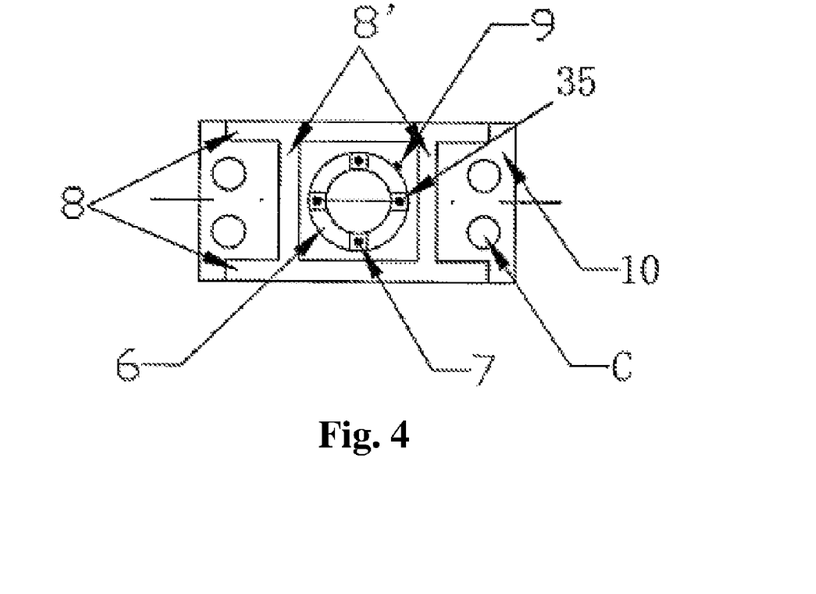
FIG. 4 is a top view of a mobile phone with a bidirectional swiveling display of according to one embodiment the invention.
Figure 7:
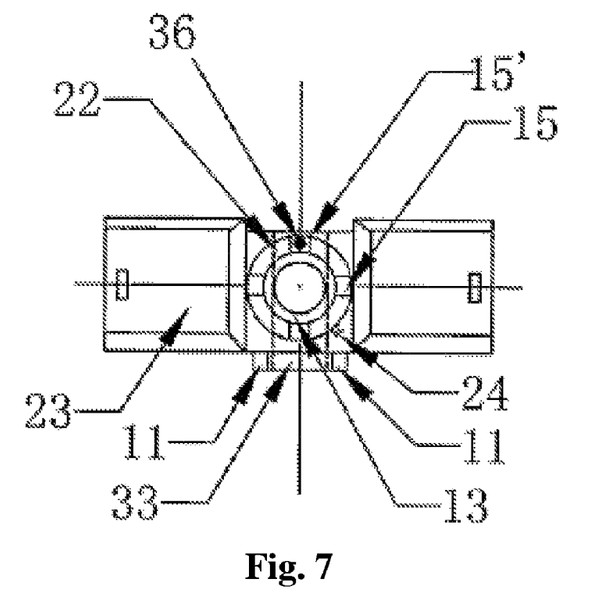
FIG. 7 is a bottom view of a rotating portion and a multifunctional compartment of a main portion of a mobile phone with a bidirectional swiveling display according to one embodiment of the invention.
Figure 8:
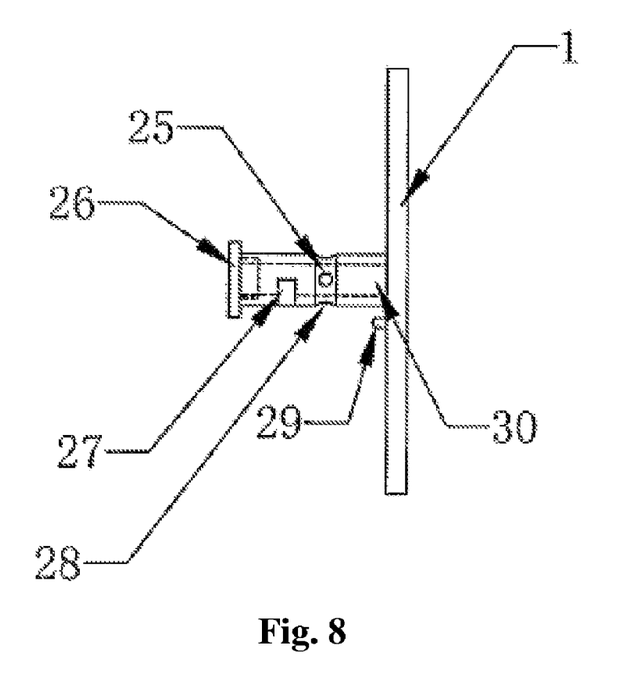
FIG. 8 is a side view of a display connected to a second axis according to one embodiment of the invention.
Figure 9:
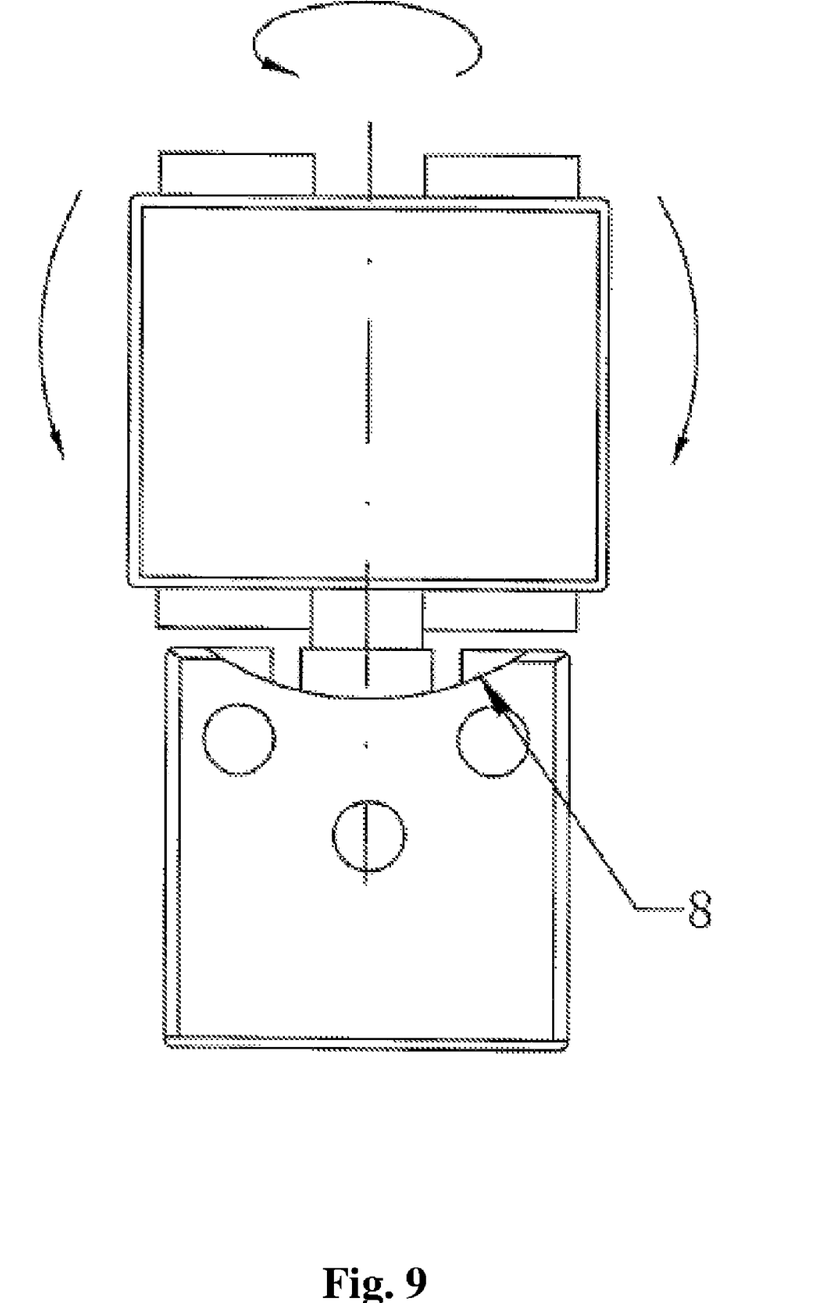
FIG. 9 illustrates a display of a mobile phone with a bidirectional swiveling display in a forward and horizontal direction according to one embodiment of the invention.
Figure 10:
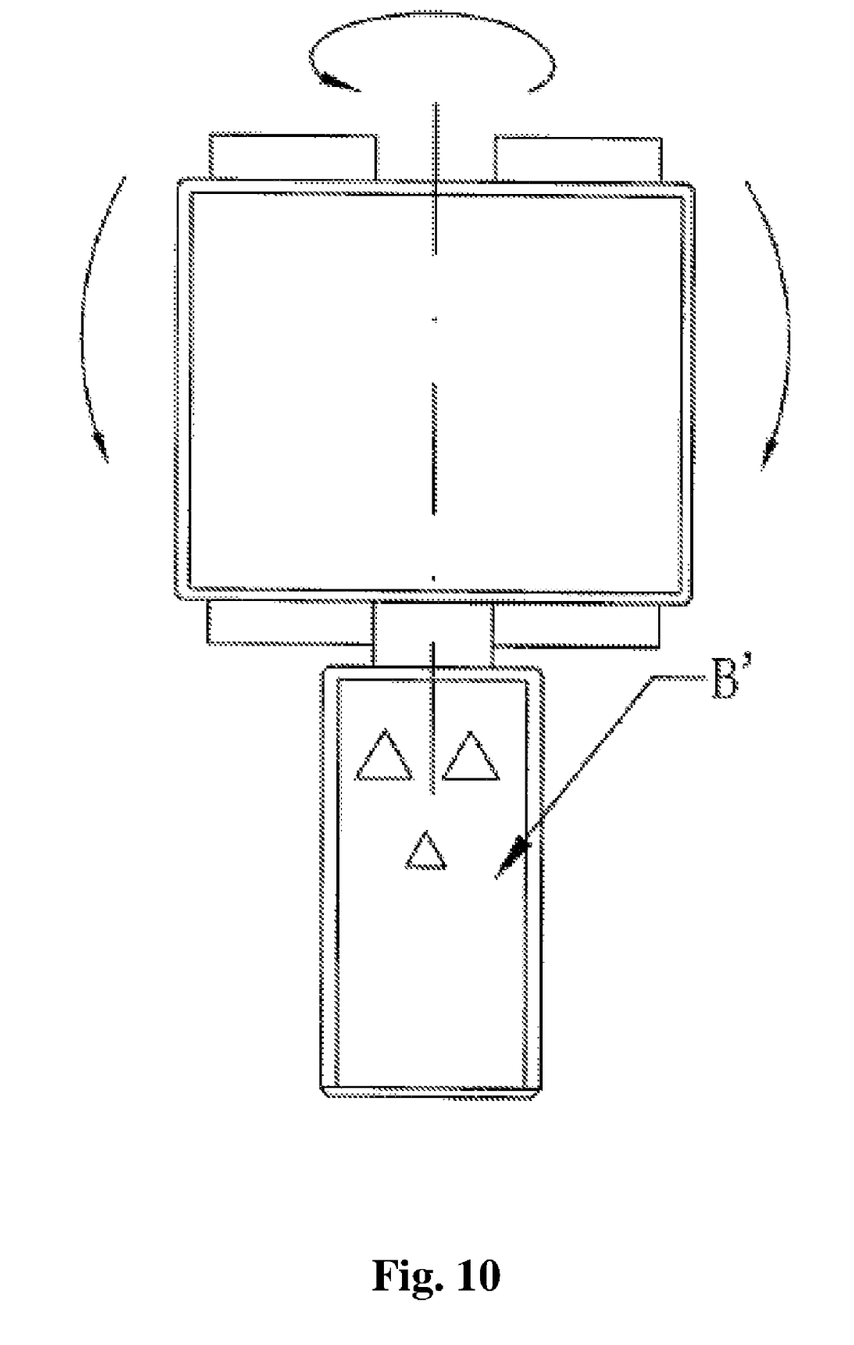
FIG. 10 illustrates a display of a mobile phone with a bidirectional swiveling display in a lateral and horizontal direction according to one embodiment of the invention.

As shown in FIGS. 4 and 7, a first tab 24 extends downwardly from the bottom of the body 4, and a first stop block 9 is disposed on an outer surface of the top of the hollow supporter 3. The first tab 24 is engaged with the first stop block 9, so as to prevent the display 1 from continuously rotating around the first axis 13. Namely, as the display 1 rotates around the first axis 13, the first tab 24 stops the first stop block 9, and thus the rotating portion cannot drive the display 1 to continuously rotate in the same direction.

Moreover, upon rotating around the first axis 13, the display 1 is capable of being engaged with keypads on the main portion 2 to implement different functions for the mobile phone with a bidirectional swiveling display. As shown in FIGS. 1-4 and 10, a plurality of groups of keypads A, A', B, B', C and C' are disposed on front, back, left and right surfaces and an upper end surface 10 of the main portion 2. A group of keypads C disposed on the upper end surface 10 of the main portion 2 is located at both ends thereof. As the display 1 rotates around the first axis 13 to a position where a display of the display 1 is approximately parallel to a left or right side of the main portion 2, a group of keypads C disposed at both sides of the upper end surface 10 of the main portion 2 are exposed. A user is capable of inputting required data via the groups of keypads A, A', B, B', C and C'.

Figure 6:
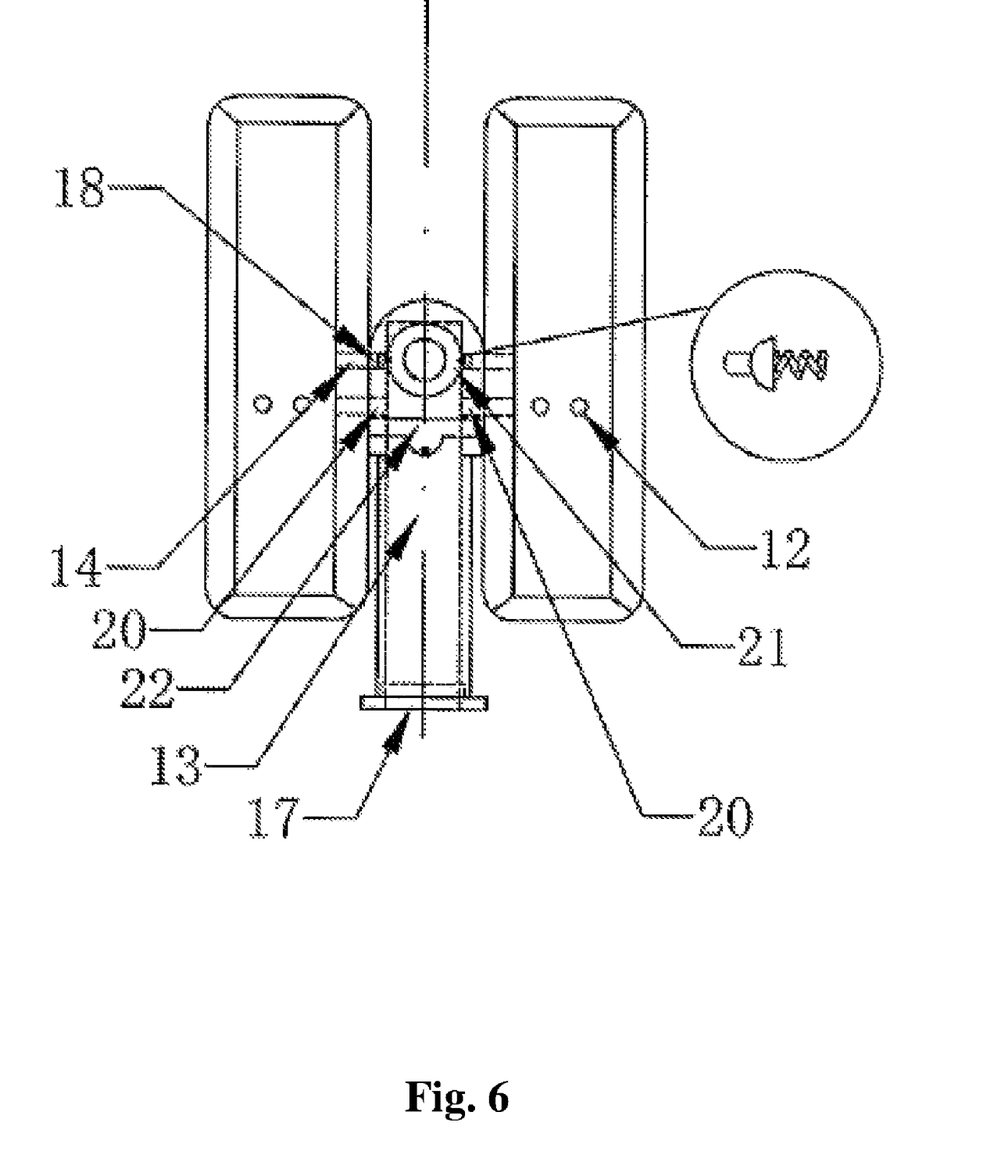
FIG. 6 is a front view of a rotating portion and a multifunctional compartment of a main portion of a mobile phone with a bidirectional swiveling display according to one embodiment of the invention.

Connection control of the keypads A, A', B, B', C and C' will be described below. As shown in FIGS. 4, 6 and 7, four protrusions 15, each having a semicircular cross-section, extend downwardly from the bottom (a circular surface 22 as shown in FIGS. 6 and 7) of the body 4. A first contact 36 is disposed on one protrusion 15'. Four first grooves 7 corresponding to and engaged with the four protrusions 15 are disposed on the end surface on the top of the hollow supporter (namely the circular surface 6 as shown in FIG. 4). Each one of the first grooves has a semicircular cross-section and a second contact 35. The first contact 36 contacts with the second contact 35 as the display 1 rotates around the first axis 13, so as to control the keypads A, A', B, B', C and C' on the main portion 2.

As the display 1 rotates around the first axis 13 to a position where the first contact 36 contacts with the second contact 35, circuit connections between the display 1 and corresponding keypads are made. For example, as the display 1 rotates to a position where the display 1 is parallel to the plane of the keypad B or B', the keypad C in vicinity of the keypad B or B' operates along with the keypad B or B', and another keypad C on the other side thereof does not operate. This is because that rotation of the display 1 leaves space for operating the keypad C.

One of the main differences between the mobile phone of the invention and that in the art is that only when the display 1 rotates to a position with respect to the main portion 2, can the display 1 and corresponding keypads be powered on and operate; as for other keypads, since no power is supplied thereto, they cannot be controlled, and thus undesired operation is prevented.

To prevent the display 1 from continuously rotating around the second axis 30, a hollow protruding edge 33 is disposed on the front surface of the body 4 opposite the back of the display 1; a pair of second tabs 11 is disposed at both sides of the hollow protruding edge 33; a pair of second stop blocks 29 are disposed at the back of the display 1; and the second tab 11 is engaged with the second stop block 29, so as to limit a rotational range of the display 1 with respect to the second axis 30.

Moreover, to fix the display 1 at a predetermined position as the display 1 rotates around the second axis 30, a pair of sockets 14 are disposed at both sides of the hole 21 of the body 4, and connected to the hole 21. An abutting portion is disposed in each of the sockets 14, and has a spring disposed on one side thereof. A second groove is surroundingly disposed on an outer surface of the second axis 30, and a concave 25 is disposed in the second groove 28 at every certain angle. One end of the abutting portion 18 is inserted into or removed from the concave 25, so that the display 1 is fixed at a certain angle while rotating around the second axis 30. The angle is preferably 90 degrees.

In addition, to make it more flexible for the display 1 to rotate around the second axis 30, a pair of arc-shaped grooves 8 is disposed on upper edges of the front and the back of the main portion 2, and another pair of arc-shaped grooves 8' perpendicular to the front and the back of the main portion 2 is disposed on the upper end surface 10 of the main portion 2.

A structure designed for multiple functionalities and personalization of the mobile phone with a bidirectional swiveling display of the invention will be described below. As shown in FIGS. 2 and 3, a pair of multifunctional compartments 5 is disposed on both sides of the body 4 and is fixedly connected to the body 4, so as to enable the multifunctional compartments 5 to rotate along with the display 1 as the display 1 rotates around the first axis 13. A cover plate 23 is disposed at the bottom of the multifunctional compartments 5. A slot (not shown) or a battery may be disposed in the multifunctional compartment 5, and a battery contact 12 is disposed on a side plate of the multifunctional compartment 5. A mini-speaker or a changeable adapter having a card holder and a module socket on both sides thereof is disposed in the slot, and thus functions of the mobile phone with a bidirectional swiveling display of the invention are enhanced.

Figure 5:
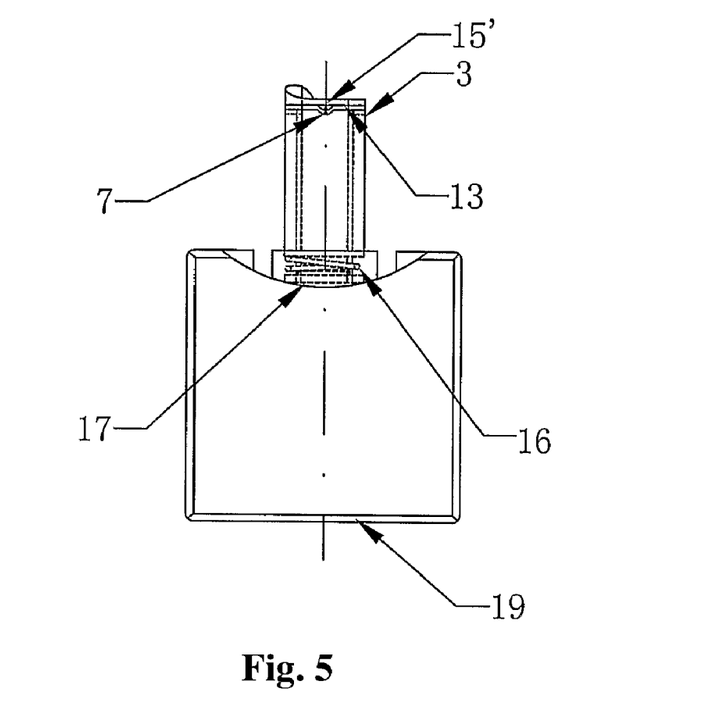
FIG. 5 is a front view of a main portion of a mobile phone with a bidirectional swiveling display according to one embodiment of the invention.
Figure 11:
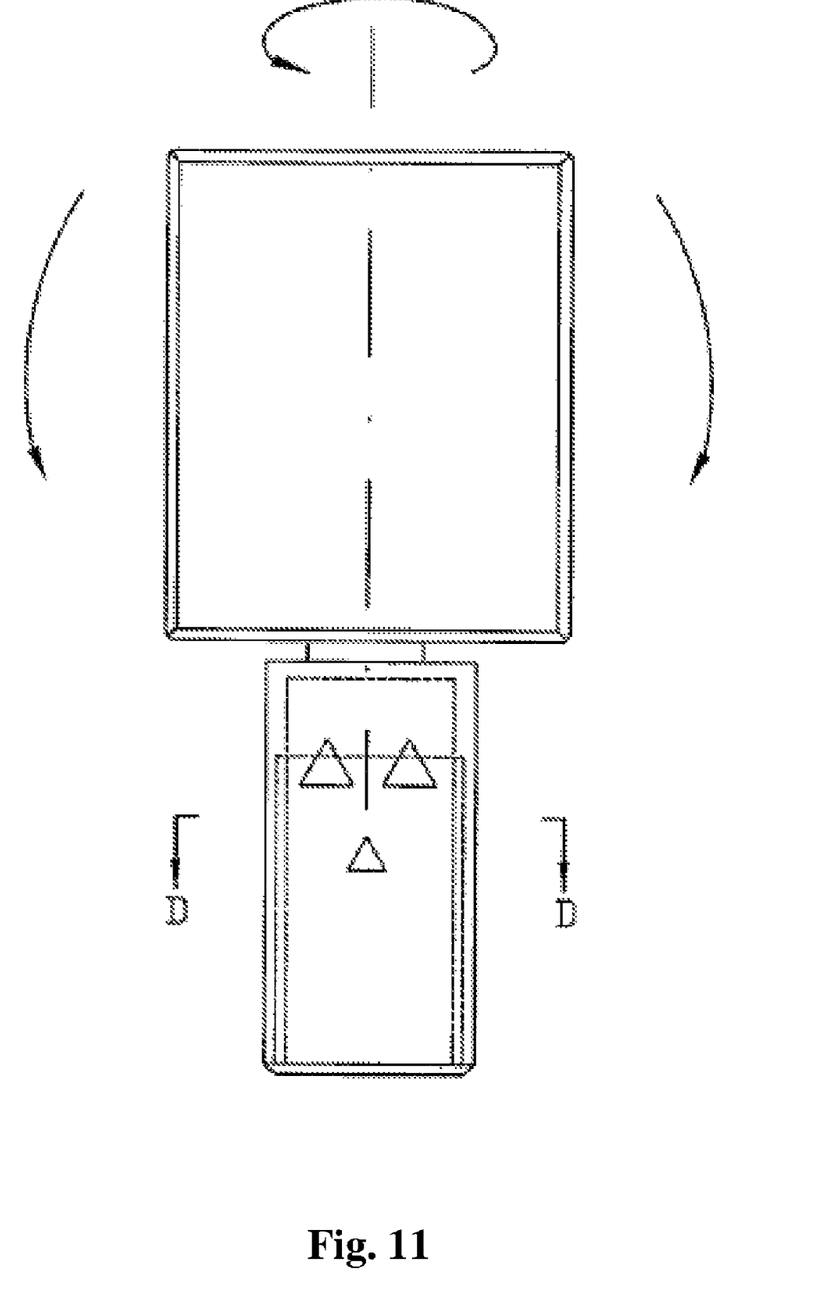
FIG. 11 illustrates a display of a mobile phone with a bidirectional swiveling display in a lateral and vertical direction according to one embodiment of the invention.
Figure 12:
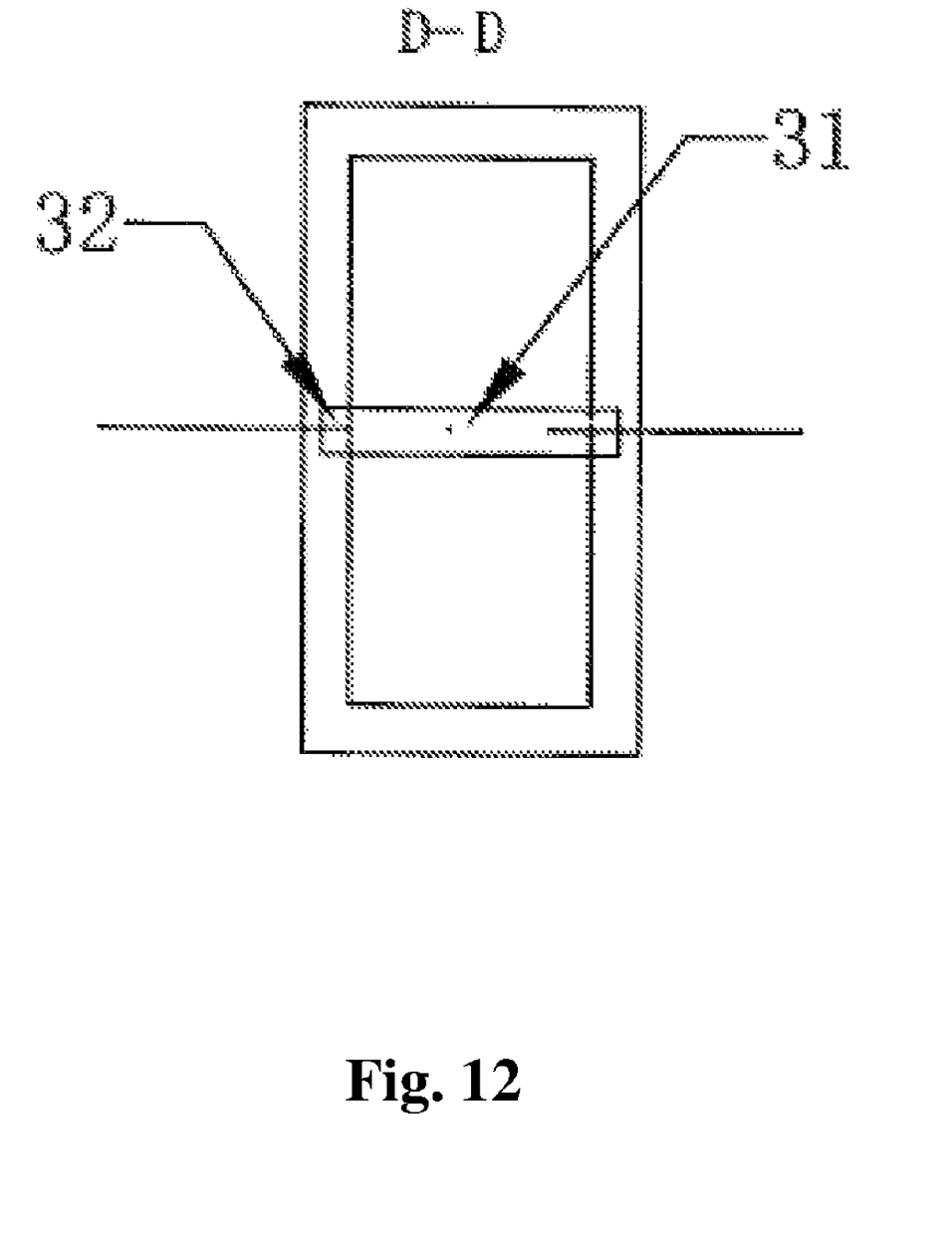
FIG. 12 is a cross-sectional view taken along a D-D line of FIG. 11.

As shown in FIGS. 11 and 12, an inner part of the main portion 2 is a closed hollow shell. As shown in FIG. 5, a cover plate 19 is disposed at the bottom of the hollow shell, so as to seal it. A pair of inserting slots 32 are disposed on opposites sidewalls in the main portion 2. A changeable adapter 31 having a card holder and a module socket on both sides thereof is disposed in the inserting slot 32. The adapter 31 may be selected freely by a user as required.

Additional modifications to the embodiments of the invention can be made as follows.

Positions of the protrusions 15 and the first groove 7 are changeable.

The circular surface 22 may be infolded into a bottom of the body 4, so as to strengthen supporting of the hollow supporter 3 to the first axis 13.

As the second axis 30 is hollow, an opening 27 is disposed on the second axis 30 other than the second groove 28, so as to enable a wire of the displaying part 1 to pass through the opening 27.

As the second axis 30 is hollow, a cover plate 26 or a webcam may be disposed on or near the end portion of the second axis 30 away from the back of the display 1. One end of the cover plate 26 is inserted into and fixed to a hollow cavity of the second axis 30. The external diameter of the other end of the cover plate 26 is greater than an inner diameter of the hollow cavity of the second axis 30, so as to prevent the second axis 30 from detaching from the hole 21 as the cover plate 26 is inserted into the second axis 30.

As shown in FIG. 6, as the first axis 13 is hollow, a hollow sealing cover 17 is disposed at the bottom of the first axis 13, and a spring 16 is disposed between a top of the hollow sealing cover 17 and a bottom of the hollow supporter 3, so as to support the first axis 13, and to enable the first axis 13 and the hollow supporter 3 to relatively move in the axial direction of the first axis 13.

As the first axis 13 is hollow, a wire on the battery contact 12 disposed on the side plate of the multifunctional compartment 5 passes through a through hole 20 and the first axis 13, and is connected to the main portion 2.

A plurality of pads is disposed between the first axis 13 and the hollow supporter 3, and between the second axis 30 and the through hole 21. Alternatively or additionally, anti-abrasive coatings may be coated therebetween.

An operating circuit of the mobile phone with a bidirectional swiveling display of the invention is similar as that of a mobile phone in the art, and will not be described in detail herein.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A mobile phone with a bidirectional swiveling display, comprising:
    a display;
    a main portion;
    a hollow supporter;
    a rotating portion having a body and a second axis;
    a first axis disposed in said body; and
    a hole disposed horizontally in said body;
    wherein
        said first axis is disposed perpendicularly to said hole;
        said first axis is rotatably inserted in said hollow supporter;
        one end of said second axis is fixed at the back of the display;
        the other end of said second axis is rotatably inserted in said hole, so that said display rotates around said second axis; and
        said display rotates around said first axis.

2. The mobile phone of claim 1 further comprising
    a first tab; and
    a first stop block;
    wherein
        said first tab extends downwardly from the bottom of said body;
        said first stop block is disposed on the outer surface of the top of said hollow supporter; and
        said first tab is engaged with said first stop block and prevents said display from rotating around said first axis.

3. The mobile phone of claim 1, further comprising
    four protrusions each having a semicircular cross-section;
    a first contact;
    a second contact; and
    four first grooves each having a semicircular cross-section;
    wherein
        said four protrusions are disposed at the bottom of said body;
        said first contact is disposed on one of said protrusions;
        said four first grooves corresponding to and engaged with said four protrusions are disposed on an end surface of said hollow supporter;
        said second contact is disposed on each of the first grooves; and
        said first contact contacts with said second contact at certain positions of rotation of said display around said first axis.

4. The mobile phone of claim 1, further comprising several groups of keypads wherein
    said several groups of keypads are disposed on front, back, left, and right surfaces and the upper end surface of said main portion; and
    one of said several groups of keypads disposed on the upper end surface of said main portion is located at both ends thereof.

5. The mobile phone of claim 1, further comprising
    a hollow protruding edge;
    a pair of second tabs; and
    a pair of second stop blocks;
    wherein
        said hollow protruding edge is disposed on the front surface of said body opposite to the back of said display;
        said pair of second tabs are disposed at both sides of said hollow protruding edge;
        said pair of second stop blocks are disposed at the back of said display; and
        said second tab is engaged with said second stop block and prevents said display from rotating around said second axis.

6. The mobile phone of claim 1, further comprising
    a pair of sockets;
    an abutting portion; and
    a spring;
    wherein
        said pair of sockets is disposed at both sides of said hole, and connected thereto;
        said abutting portion is disposed in each of the sockets; and
        said spring is disposed in one side of said abutting portion.

7. The mobile phone of claim 6, comprising further
    a second groove; and
    a concave;
    wherein
        said second groove is surroundingly disposed on the outer surface of said second axis; and
        said concave is disposed in said second groove every certain angle.

8. The mobile phone of claim 7, wherein one end of said abutting portion is inserted into or removed from said concave so that said display is positioned while rotating around said second axis.

9. The mobile phone of claim 1, further comprising an opening, wherein said opening is disposed on said second axis, so as to enable a wire of said displaying part to pass through.

10. The mobile phone of claim 1, comprising further a cover plate, wherein said cover plate is disposed on one end of said second axis, so as to seal its end.

11. The mobile phone of claim 1, further comprising a camera, wherein said camera is disposed on one end of said second axis.

12. The mobile phone of claim 1, further comprising
    a first pair of arc-shaped grooves; and
    a second pair of arc-shaped grooves;
    wherein
        said first pair of arc-shaped grooves is disposed on upper edges of the front and the back of said main portion, and said second pair of arc-shaped grooves perpendicular to the front and the back of said main portion is disposed on said upper end surface of said main portion, so as to enable said display to rotate around said second axis.

13. The mobile phone of claim 1, further comprising
a hollow sealing cover; and
a spring;
wherein
    said hollow sealing cover is disposed at the bottom of said first axis; and
    said spring is disposed between a top of said hollow sealing cover and a bottom of said hollow supporter supporting said first axis.

14. The mobile phone of claim 1, further comprising
a pair of multifunctional compartments;
a slot; and
a changeable adapter having a card holder and a module socket on both sides thereof;
wherein
    said pair of multifunctional compartments is disposed on both sides of said body;
    said pair of multifunctional compartments is disposed in said multifunctional compartment; and
    said changeable adapter is disposed in said slot.

15. The mobile phone of claim 1, further comprising
a pair of multifunctional compartments; and
a battery;
wherein
    said pair of multifunctional compartments is disposed on both sides of said body; and
    said battery is disposed in said multifunctional compartment.

16. The mobile phone of claim 1, further comprising
a pair of inserting slots;
a changeable adapter having a card holder and a module socket on both sides thereof;
wherein
    said pair of inserting slots is disposed on opposites sidewalls in said main portion; and
    said changeable adapter is disposed in said inserting slot.

* * * * *